United States Patent [19]

deCarmo

[11] Patent Number: 5,574,905

[45] Date of Patent: Nov. 12, 1996

[54] METHOD AND APPARATUS FOR MULTIMEDIA EDITING AND DATA RECOVERY

[75] Inventor: Linden A. deCarmo, Plantation, Fla.

[73] Assignee: International Business Machines Corporation, Armonk, N.Y.

[21] Appl. No.: 249,318

[22] Filed: May 26, 1994

[51] Int. Cl.⁶ .................................................. G06F 17/30
[52] U.S. Cl. ............................. 395/601; 364/DIG. 1; 364/222.81; 364/282.3; 364/283.1; 364/282.4
[58] Field of Search ............................ 395/11, 154, 600

[56] References Cited

U.S. PATENT DOCUMENTS

| | | | |
|---|---|---|---|
| 5,001,628 | 3/1991 | Johnson et al. | 395/600 |
| 5,175,852 | 12/1992 | Johnson et al. | 395/600 |
| 5,208,745 | 5/1993 | Quentin et al. | 364/188 |
| 5,247,658 | 9/1993 | Barrett et al. | 395/600 |
| 5,249,289 | 9/1993 | Thamm et al. | 395/600 |
| 5,263,136 | 11/1993 | Deaguiar et al. | 395/164 |
| 5,267,351 | 11/1993 | Reber et al. | 395/600 |
| 5,276,805 | 1/1994 | Hamaguchi | 395/164 |
| 5,318,710 | 6/1994 | Kruesi et al. | 395/182.13 |
| 5,347,632 | 9/1994 | Filepp et al. | 395/200 |
| 5,355,472 | 10/1994 | Lewis | 395/600 |
| 5,384,890 | 1/1995 | Anderson et al. | 395/2 |

*Primary Examiner*—Wayne Amsbury
*Attorney, Agent, or Firm*—Bookstein & Kudirka; Bruce D. Jobse

[57] ABSTRACT

A specialized linked-list editing structure is used to order multimedia file segments in a multimedia file to be edited. Each multimedia file segment is comprised of a number of contiguous data units, which may preferably be bytes, that are portions of the overall multimedia file even though the file segments may be physically located in different data files. The linked list is arranged as a plurality of nodes where each node represents a single file segment and the linked list orders all of the file segments to make up the entire multimedia file. Accordingly, editing can be performed at the data unit level so that both compressed and uncompressed files can be handled. Editing operations on the file result in changes to this linked-list structure instead of the file itself, thus avoiding the necessity of making file copies. More particularly, the linked-list structure consists of a list of records called "file descriptor nodes". Each node comprises a record which contains information about a corresponding file segment, including, the address of the physical file in which the segment is located, the physical position of the segment in its file, the length in data units of the segment and a "logical starting position" number which indicates the position of the file segment relative to other segments in the overall multimedia file so that a particular segment can be located during a seek operation.

22 Claims, 9 Drawing Sheets

METHOD AND APPARATUS FOR MULTIMEDIA EDITING AND DATA RECOVERY

FIELD OF THE INVENTION

This invention relates to methods and apparatus for editing multimedia data files, including compressed and uncompressed audio and video files.

BACKGROUND OF THE INVENTION

"Multimedia" computer systems are gaining popularity in many markets. A typical multimedia computer system can receive analog audio and video information, process the information and store it as digitized signals. The stored audio and video information can then be edited and reproduced in a coordinated manner.

Such multimedia systems typically comprise both computer software and specialized computer hardware that provides an interface between the computer and analog video and audio processing components, such as microphones, speakers, cameras and tape recorders. During a process called "recording," the specialized hardware periodically samples an incoming analog signal and encodes the amplitude of each signal sample into a digital word. The resulting stream of digital words forms a set of digitized data that can be manipulated by the computer. The incoming digitized data is typically stored on a disk or other large scale storage system as a multimedia data file where the data can be edited and later reconverted to an analog signal by means of other computer hardware during a process called "playback."

Although the sampling frequency and the number of bits used to encode each sample determine the actual amount of space required to store a given multimedia file, in general, the storage space required is relatively large. Consequently, multimedia data files are often processed by using further encoding techniques to reduce the required storage space in a process that is typically called "compression." Some of the more conventional compression techniques include Adaptive Pulse Code Modulation (APCM), μ-law, and Run-Length Encoding (RLE). A given digital signal file is either totally uncompressed or totally compressed, however, it is common to operate in environments where some multimedia files are compressed, while others are not.

Once digitized information has been stored, it is possible to edit the stored information (and, consequently, the reproduced analog signal) by means of software that allows a user to directly manipulate the stored digital signals. There are many commercially available software applications that can perform such editing operations as insertion, deletion and overwriting selected portions of the data. Some software also provides for data recovery that allows one or more previous editing operations to be reversed or "undone". Other software includes journaling ability or the ability to redo editing operations that have been "undone" during a data recovery operation.

For example, generic database software typically can perform data recovery and journaling operations, however, a conventional generic database cannot correctly edit multimedia data and cannot correctly save the state of multimedia files. Further, conventional database software does not properly operate with compressed multimedia files.

In order to overcome these difficulties prior art approaches have developed application software designed specifically for editing multimedia files, such as digital audio. These digital editor applications have implemented editing support for both compressed and uncompressed files, however there are limitations. For example, prior art digital multimedia editing applications have relied on disk storage to save the data and, in order to ensure data integrity, such applications typically make a copy of a file and perform editing on the copy by directly changing the ordering of the copy. The time required to copy relatively large multimedia files and move sections of the files makes such editing operations relatively slow.

In addition, prior art digital editors often have poor data recovery support. Unlike word processors, conventional digital editors do not offer unlimited undo/redo capability due to the expense generally involved in implementing such features. Further, since each specialized editing application must include complete editing support for every type of multimedia file, every such application must include essentially the same editing code, resulting in a much larger overall program. Large programs, in turn, entail maintenance difficulties and coordination problems since multiple vendors must attempt to fix similar bugs.

In order to overcome the latter difficulty, attempts have been made to incorporate multimedia editing support directly into a computer operating system. This approach has the advantage that each digital editing application does not have to duplicate the same code thereby eliminating the maintenance difficulties associated with the separate application programs. However, existing operating environments contain only rudimentary digital editing support. For example, a popular operating system called Microsoft WINDOWS™ 3.1 developed and sold by the Microsoft Corporation, Redmond, Washington, does provide facilities for multimedia file manipulation. However, the editing facilities available only allow overwrite of a file and insertion into a file. Other editing functions, such as deletion, data recovery and journaling are not available and the program cannot edit compressed files. Another prior art system called the Multimedia Presentation Manager 2 (MMPM/2) marketed by the International Business Machines Corporation, Boca Raton, Fla., has the same simple facilities as the above-mentioned WINDOWS™ program.

A further prior art program called QUICKTIME® marketed by the Apple Computer Corporation, Cupertino, Calif., has relatively sophisticated editing functions which allow sections of media to be cut and/or copied and pasted into other media types. However, this latter program also has limitations in that it has limited data recovery and journaling support and it can only work with QUICKTIME® file formats.

Accordingly, it is an object of the present invention to provide a multimedia file editing and data recovery system which can accurately and rapidly edit multimedia files.

It is another object of the present invention to provide a multimedia editing system which minimizes memory use and which provides unlimited data recovery and journaling.

It is a further object of the present invention to provide a consistent, reliable file format interface that is independent for all applications and which can edit any multimedia file format, including compressed files.

SUMMARY OF THE INVENTION

The foregoing problems are solved and the foregoing objects are achieved in one illustrative embodiment of the invention in which a specialized linked-list editing structure is used to order multimedia file segments. Each multimedia file segment is comprised of a number of contiguous data units, which may preferably be bytes, that are portions of the overall multimedia file even though the file segments may be physically located in different data files. The linked list is arranged as a plurality of nodes where each node represents a single file segment and the linked list orders all of the file segments to make up the entire multimedia file. Accordingly, editing can be performed at the data unit level so that both compressed and uncompressed files can be handled. Editing operations on the file result in changes to this linked-list structure instead of the file itself, thus avoiding the necessity of making file copies.

More particularly, the linked-list structure consists of a list of records called "file descriptor nodes". Each node comprises a record which contains information about a corresponding file segment, including, the address of the physical file in which the segment is located, the physical position of the segment in its file, the length in data units of the segment and a "logical starting position" number which indicates the position of the file segment relative to other segments in the overall multimedia file so that a particular segment can be located during a seek operation.

Initially, the entire file is considered to be a single segment and can be described by a single node. However, during the editing process when information is inserted or deleted, additional nodes are created and added to the list. Therefore, all file updates, including overwrites, deletions and inserts are list manipulations rather than actual file manipulations, and, accordingly, changes can be processed very rapidly.

Separate file manipulation lists are maintained in order to provide undo and journaling capability. These file manipulation lists store "snapshots" of the file descriptor lists at selected periods of time and can be used to reset the state of the file manipulation list in order to provide undo and redo capabilities.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
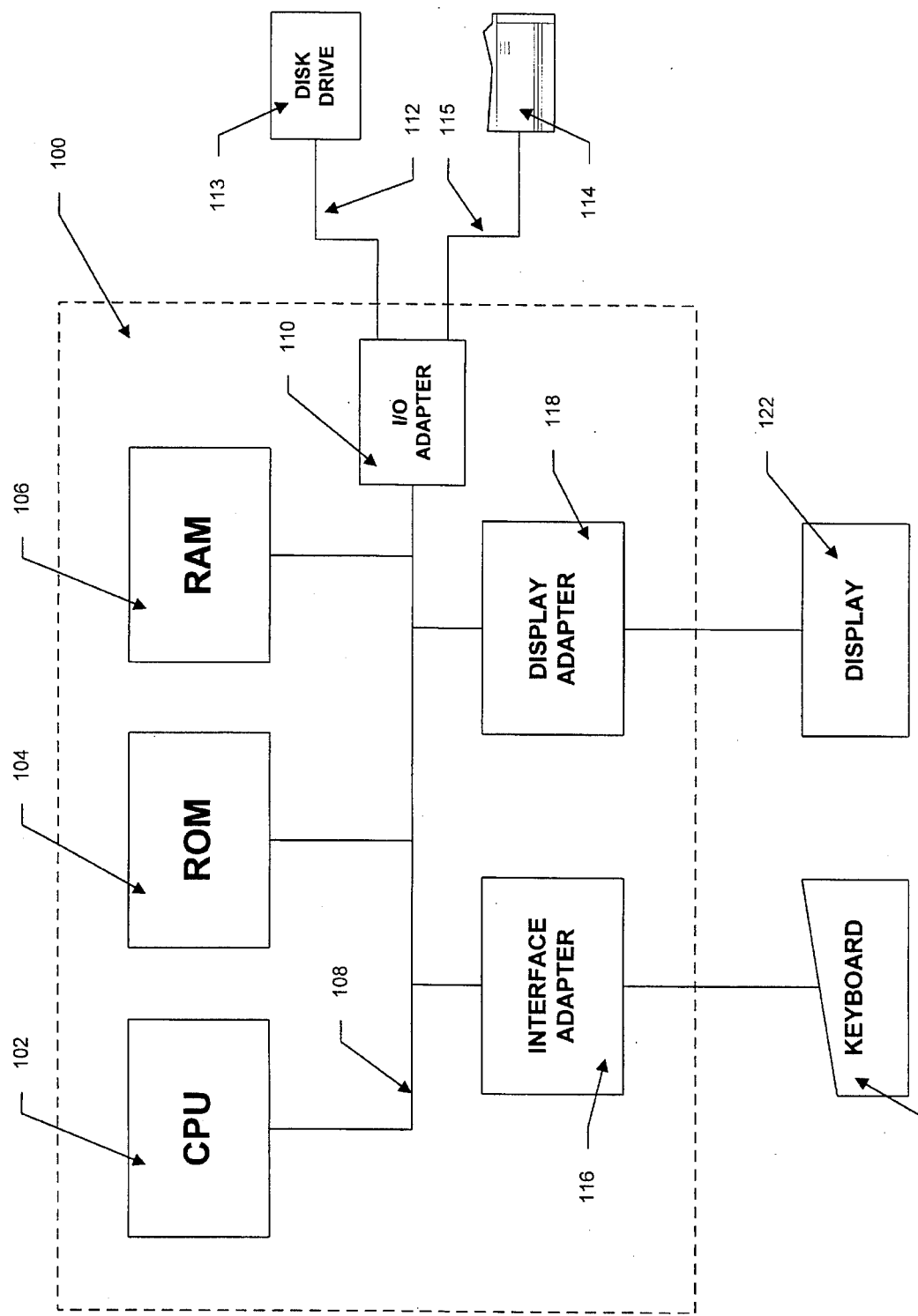
FIG. 1 is a block schematic diagram of a computer system, for example a personal computer system, on which the inventive multimedia file editing system operates.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. The workstation has resident thereon and is controlled and coordinated by operating system software such as the OS/2® operating system developed and sold by the International Business Machines Corporation, Boca Raton, Fla.

In accordance with conventional storage techniques, each file which is stored on data storage device or located in the system main memory is comprised of a number of file "blocks" and an index file which indicates, in sequence, where each block is located so that the file can be reconstructed by storing or retrieving the blocks in the sequence indicated by the file index. The problem with such an arrangement is that the block size is often optimized so that it is compatible with buffer and cache sizes and generally consists of a large number of bytes (for example, 256 or 512 bytes). Consequently, such a file cannot be easily edited by manipulating the index file because the large block size causes problems with compressed files.

Figure 2:
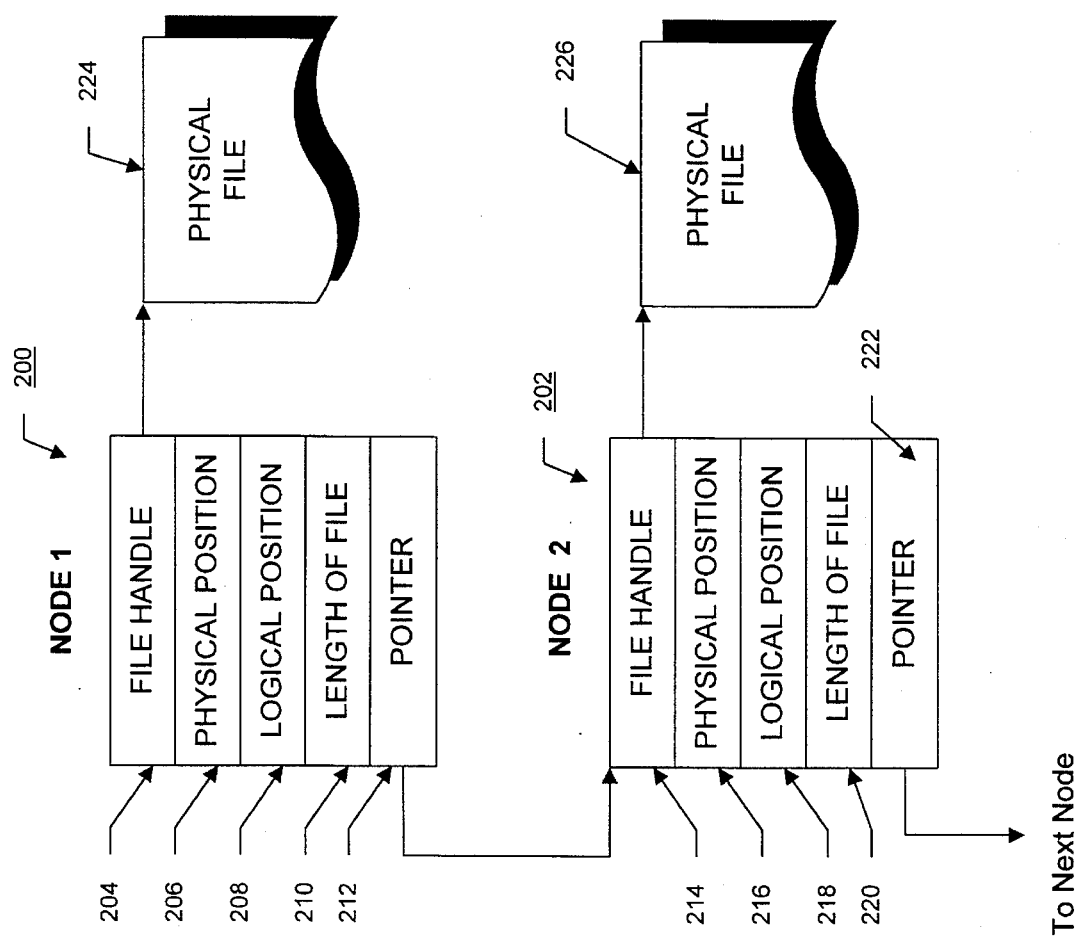
FIG. 2 is a block diagram of a section of the file descriptor list illustrating the contents of two selected nodes.

In accordance with the present invention, apart from the conventional file structure, each multimedia file is represented by a file descriptor list and two file manipulation lists. The file descriptor list is a linked-list of file descriptor "nodes" where each of the nodes holds selected information that describes the location and length of a file segment. For example, a section of such a linked-list is shown in FIG. 2. The illustrated list section consists of node 200 and node 202; additional nodes may be present in the list which describes a single multimedia file, however, these additional nodes contain the same type of information as nodes 200 and 202 and are not shown for clarity.

Each node, for example, node 200, is associated with a file segment and contains information regarding the length of the file segment and its location both in the physical file where the segment is actually located and the location of the segment in the overall multimedia file which is comprised of a plurality of file segments. The file segment has a size which depends on the editing operation used to create the segment. The size is preferably expressed in data units of one byte length, but may be expressed in other data units (for example, bits) depending on the type of sampling and editing operations which are being performed. In the discussion herein, file sizes and locations will be expressed in terms of bytes for the sake of clarity without any intention of limiting the discussion to that particular data unit. The size may range from zero bytes in the case where an empty file is being inserted into the multimedia file to many thousands of bytes in the case of a large insertion.

More particularly, each node comprises five pieces of information regarding the associated file segment: a file handle 204 which identifies a physical file 224 in which the segment is located (generally such a file "handle" is returned in a well-known manner by the operating system when a new file is opened), the physical position 206 of the associated segment in the file identified by the file handle 204 (this number is essentially an "offset" expressed in terms of bytes from the beginning of the file), the logical starting position 208 of the file segment within the overall multimedia file (a monotonically increasing number used to locate a particular data unit within the multimedia file), the length 210 of the file segment expressed in bytes and a pointer 212 which identifies the location of the next node (illustrated as node 202 in FIG. 2) in the linked-list. Therefore each data unit which comprises the file segment has both a physical position in its actual file and a logical position in the overall multimedia file. Since the data units in each file segment are contiguous, instead of keeping the physical and logical positions for each data unit in a node, the physical and logical starting positions and the number of data units (length) of the file segment are stored in each node.

In node 200, the physical position 206 represents the actual physical location of the beginning of the associated file segment data from the beginning of the data area in the file. Generally, the data area of the file will start at a different disk address that differs from the disk address that corresponds to the file handle because most multimedia files include a header at the beginning of the file. This header includes information concerning the file type, coding arrangement, sampling rate (the number of samples per second taken by the encoding device), the precision (the number of data bits per sample) and the number of channels. This header generally has a fixed length so that the disk address of the start of the data (physical position 0) can be determined from the file handle by adding the length of the header.

Finally node 200 concludes with a pointer 212 which contains the address of the start of the next node 202. In a manner similar to node 200, node 202 comprises a file handle 214 (which identifies the location of file 226), physical position information 216, logical starting position information 218, length information 220 and a pointer 222 to the next node (not shown). The logical starting position information in node 202 follows sequentially from the logical starting position of node 200 and its length in data units. For example, if node 200 had a logical starting position of 10 and a length of 5 bytes, then the logical starting position of node 202 would be 15. During editing operations, the logical starting position of each node is adjusted to keep the logical starting positions of the data units sequential.

When a linked-list structure such as that shown in FIG. 2 is associated with a file, initially the file is described by a single node. However, after the file is edited (information is inserted or deleted) additional nodes are created as will be described in detail below. Since all file updates are manipulations of a linked-list structure such as that shown in FIG. 2, rather than actual file manipulations, the editing changes occur very rapidly.

Figure 3:
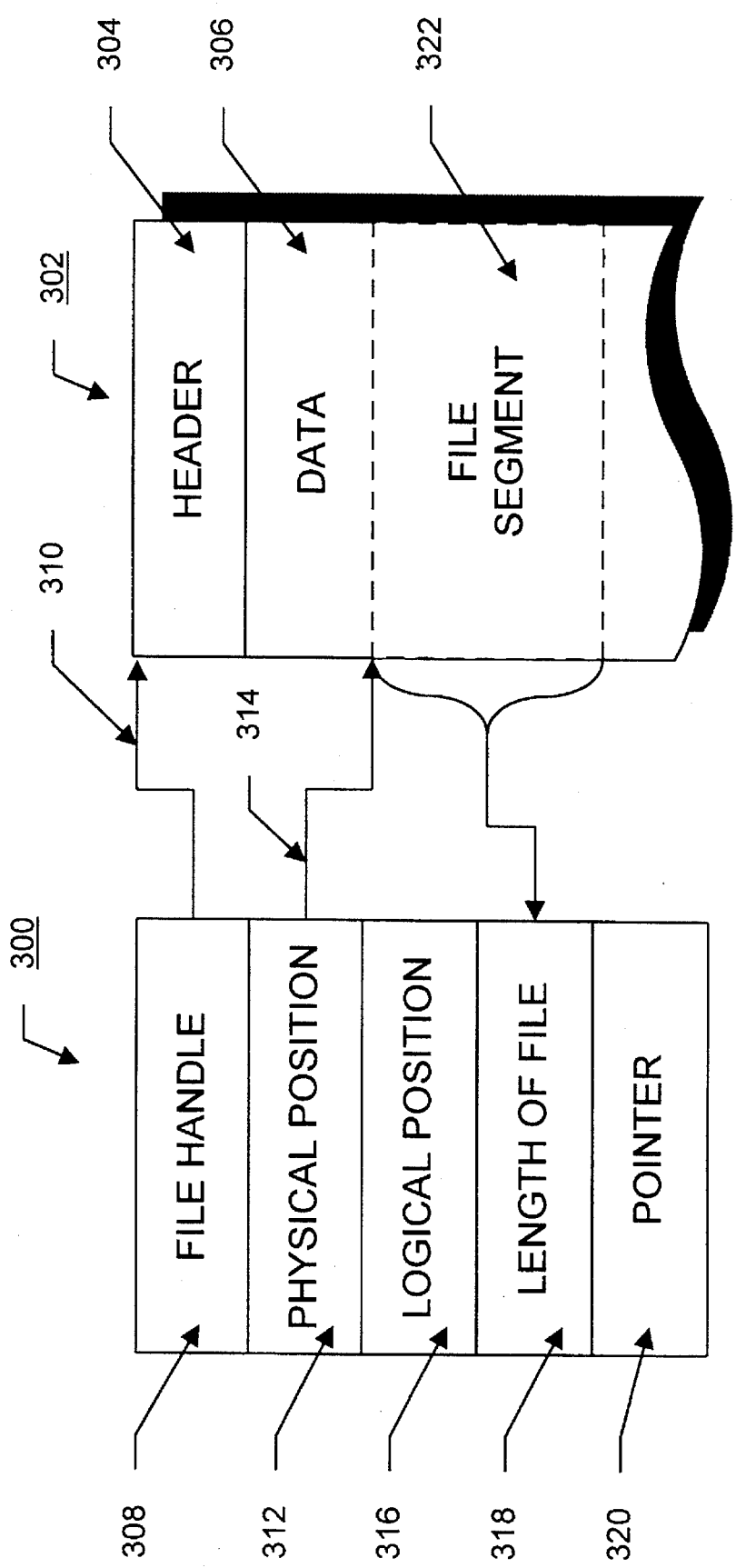
FIG. 3 is a schematic diagram indicating the content and structure of a single initial node which is associated with a newly-opened file.

The relationship of a file segment 322 and the associated file descriptor node 300 is shown in FIG. 3. In particular, file 302, as previously described, consists of a header portion 304 and a data portion 306. The file handle information 308 of node 300 is the file handle of the file 302 in which segment 322 is located as indicated by arrow 310. The physical position section 312 of file descriptor node 300 indicates the start of the file segment data portion 322 as indicated by arrow 314. The logical starting position section 316 refers to the logical position of the first data unit of the associated file segment in the multimedia file which is described by the entire file descriptor node list. In the case of a file which has not been edited, the length of the file 318 corresponds to the length the file segment 322 in bytes and pointer 320 points to the next file descriptor node (not shown).

When a file is initially opened, one file descriptor node is created with a length parameter equal to the actual length of the file. For newly-created files, the node is created with the length of zero. The physical position information is set to point to the first data byte of the data file (physical position 0) while the logical starting position information is set to "0". Since no data has been written to the newly-opened file, the node descriptor file handle is the original file handle.

The aforementioned file descriptor node list can be used to perform editing operations on a multimedia file. FIGS. 4–8 show illustrative flowcharts of methods used to manipulate the list to perform insertion, deletion and overwrite editing functions. These methods cooperate with another routine, or application program, which identifies the point (or logical unit) at which insertions and deletions are to be made. For example, such an application program might consist of a well-known visual editing program in which a screen display is generated which illustrates the sound waveform of a recorded sound.

By appropriately manipulating the display (for example, using a cursor to select a point on the displayed waveform), a point in the sound waveform at which an insertion or deletion is to be made is identified by the editing application program. The editing program then converts this point into a logical position at which point editing is to be performed. Once the appropriate logical position has been identified, the application program issues a "seek" request to cause the inventive file manipulation routines to locate the file descriptor node where the editing operations will take place. The correct node can be located because each node contains the logical starting position of the data units in the file segment and the length of the file segment and, thus, the logical position of the last data unit in the node can be easily calculated. The seek request causes the file manipulation routine to traverse the node list until a node is located which contains the data unit with the requested logical position.

Figure 4:
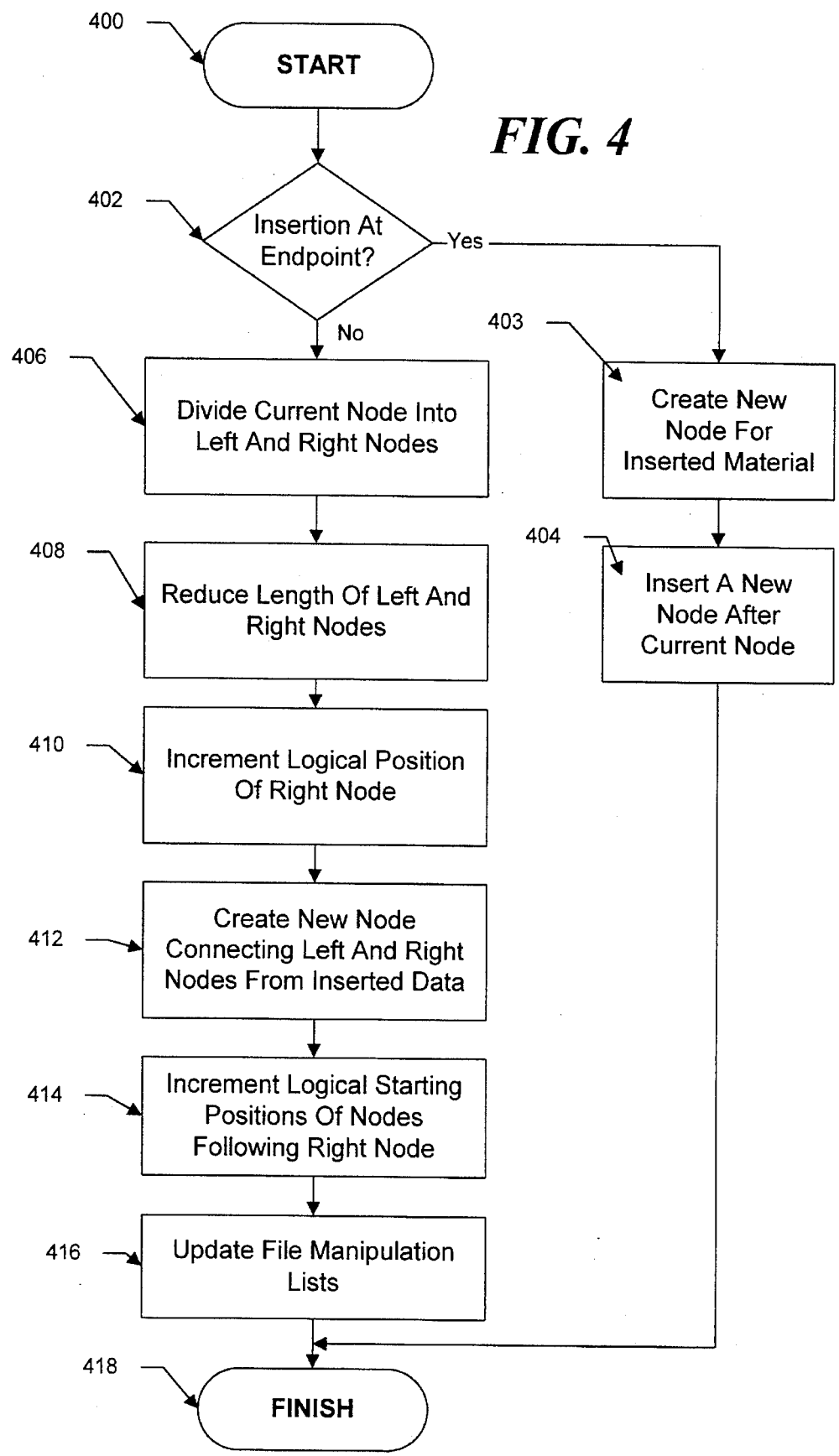
FIG. 4 is a an illustrative flowchart of a method used to manipulate the linked-list structure to perform an insertion into a multimedia file.
Figure 5:
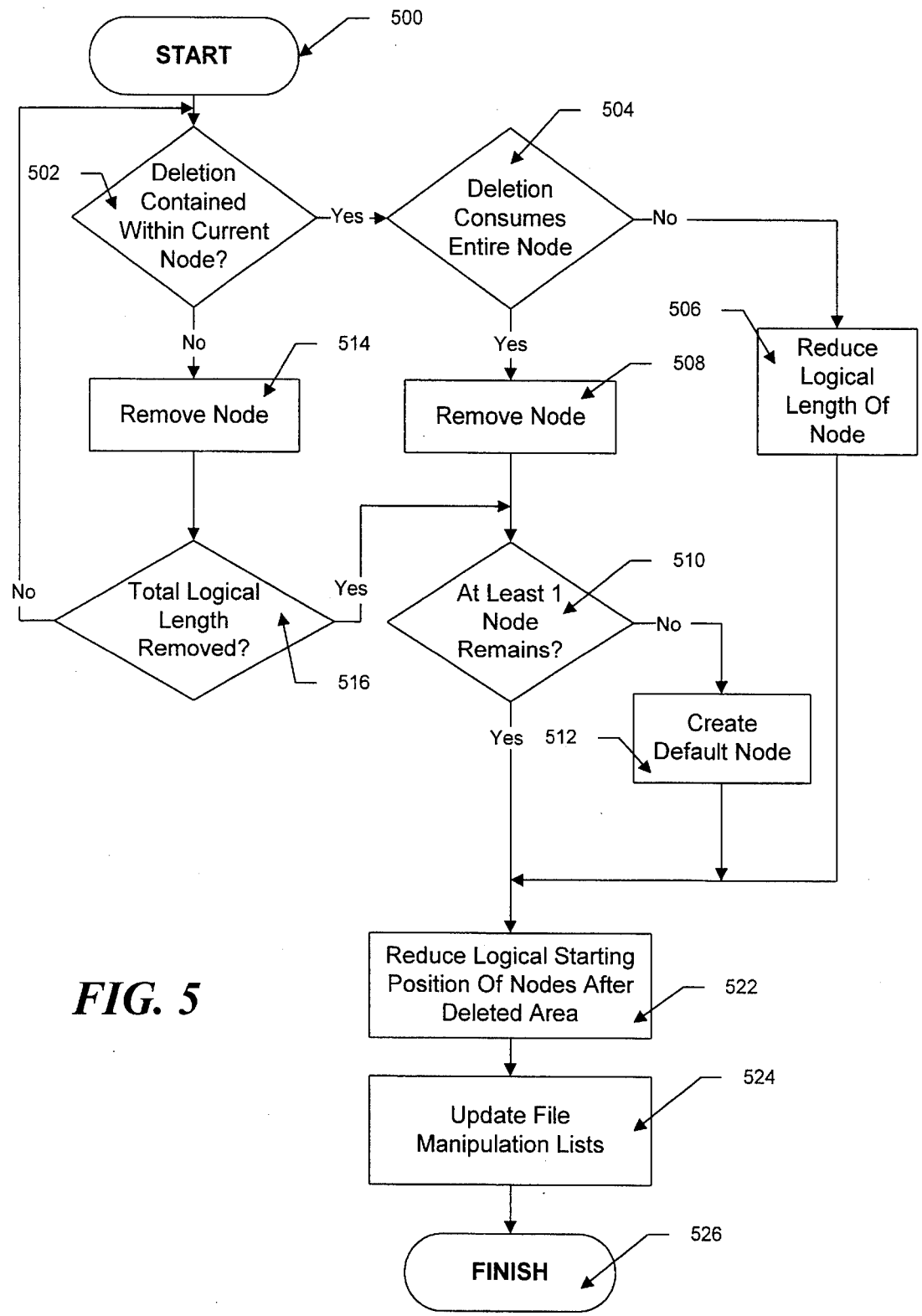
FIG. 5 is an illustrative flowchart of a method used to manipulate the linked-list structure to perform a deletion of selected sections of a multimedia file.

When the position is located, editing proceeds as shown in the method steps illustrated in FIGS. 4, 5 and 6. In particular, FIG. 4 describes the steps in an illustrative routine which can be used to insert information into a file segment described by a file descriptor node at a requested insertion point (as identified by a requested logical position) called the "current" node. An assumption is made in the discussion of the following routines that information to be inserted into a file is located in another separate file. The routine starts at step 400 and proceeds to step 402, where a determination is made whether the insertion is occurring at the endpoint of the associated file. This determination can be made from the information in the node by adding the file segment length to the data unit logical starting position to calculate the logical position of the last data unit in the node position and comparing this logical position to the requested insertion point.

If the insert is occurring at the end point, then, in step 403, a new file descriptor node is created which new node contains the file handle, physical position and length of the data which is to be inserted. The logical starting position is set to the logical position of the current node plus the current node length plus one. This newly-created filed descriptor node is then inserted into the node linked list after the current node end as indicated by step 404. This node insertion is performed by changing the pointer of the current node to point to the new node and setting the pointer information in the new node to point to a node (if any) which follows the current node in the node list. The routine then proceeds to end in step 418.

Alternatively, if in step 402, it is determined that the insertion is not occurring at the end point of the current file descriptor node, then the insertion is occurring between the logical beginning of the node and the logical end. Consequently, the current node must be divided into two nodes to allow insertion of the information as indicated in step 406. This division is done by creating a new node and copying the information in the current node to create a "left" node and a "fight" node.

Next, in step 408, the length information in the left node is reduced so that its total length corresponds to the portion of the current node which occurs before the insertion point and the length of the right node is reduced so that its total length corresponds to the portion of the current node which occurs after the insertion point. The total length remains the same but is simply divided between the left and fight nodes. Then, in step 410, the logical starting position information of the right node is incremented by the length of the insertion data.

Next, in step 412, a new node is created which contains information that describes the file segment containing the inserted data including the file handle, physical position, logical position and length of the inserted data. The logical starting position is set to the logical starting position of the left node plus its length. This new node is then connected to the fight and left nodes by changing the pointer information in the left node to point to the beginning of the new node and changing the pointer information and the new node to point to the beginning of the right node.

Next, in step 414, the logical starting positions of all nodes following the insertion point (including the right node) are incremented by the length (number of logical units) of the inserted file segment. Finally, in step 416, the file manipulation lists are updated so that data recovery and journaling operations will be possible (the construction and manipulation of the file manipulation lists will be discussed below in connection with FIGS. 7 and 8). The routine then finishes in step 418. FIG. 5 discloses an illustrative method by which the file descriptor lists are manipulated in order to delete data from the multimedia file. As previously mentioned, the deletion routine cooperates with an editing application which issues a seek request to the point where the deletion will occur and supplies the length of the deletion. The inventive deletion routine begins in step 500 and proceeds to step 502 where a determination is made whether the deletion is entirely contained within the file segment described by the current file descriptor node. If it is, the routine proceeds to step 504 in which a determination is made whether the deletion consumes the entire file segment.

If, in step 504, the deletion is less than the entire file segment, the routine proceeds to step 506 where the length of the node is reduced to account for the number of logical units which are deleted. The routine then proceeds to step 524 where the file manipulation lists are updated so that data recovery and journaling operations can take place as described below and the routine finishes in step 526.

Alternatively, if, in step 504, a determination is made that the deletion does consume the entire node, then, in step 508, the node is removed by changing the pointers of the preceding node to point the succeeding node.

Subsequently, in step 510, a determination is made as to whether at least one node exists after the node removal in step 508. Such an occurrence may, for example, happen when the entire file is deleted. If the node removal removes the last remaining node, a default node with a length of zero is created. The routine then proceeds to step 518 where the logical starting positions of all nodes following the deleted area are reduced by the length of the deletion in order to keep the logical starting positions consecutive. In step 520, the file manipulation lists are updated and the routine finishes in step 522.

If, in step 502, a determination is made that the portion of the file to be deleted extends beyond the file segment contained within the current node, then the routine proceeds to step 514 in which the current node is removed (by manipulating the pointers as described above), making the next node in the node list the "current" node. Next, in step 516, a determination is made whether the total logical length to be deleted has been removed from the file descriptor list by the removal of the current node. If not, the routine proceeds back to step 502 where the new "current" node is checked to determine whether the remaining "to be deleted" portion of the file is contained within the new current node. If not, the routine proceeds to step 514. Alternatively, the routine proceeds to step 502.

Operation continues in this manner until the total logical length of the removed nodes equals the total logical length of the deletion, at which point the routine proceeds to step 518 where the logical starting positions of all nodes following the deleted area are reduced by the length of the deletion in order to keep the logical starting positions consecutive. In step 520, the file manipulation lists are updated and the routine finishes in step 522.

Figure 6A:
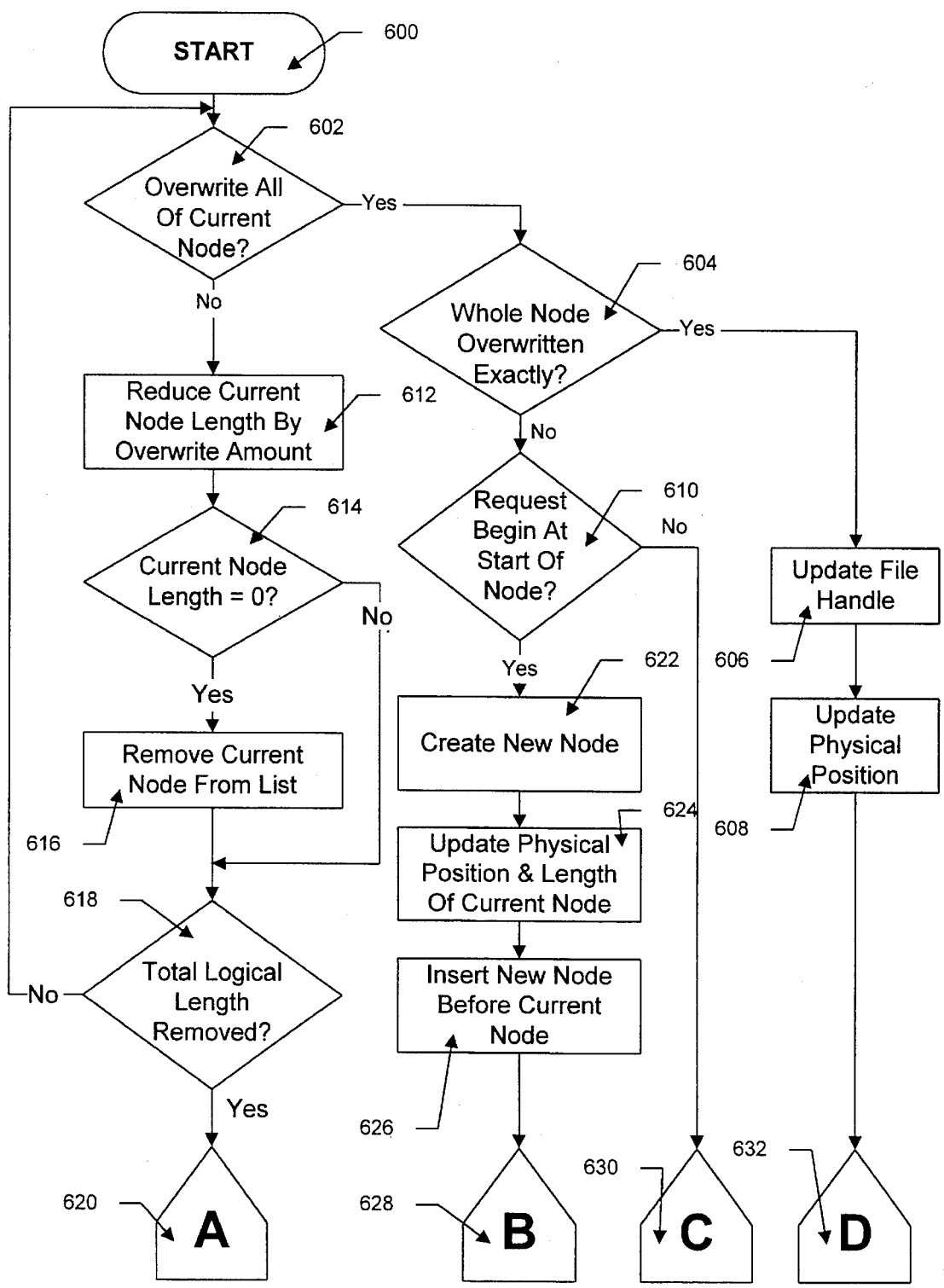
FIGS. 6A and 6B, when placed together, form an illustrative flowchart of a method used to manipulate the linked-list structure to overwrite all or part of multimedia file.
Figure 6B:
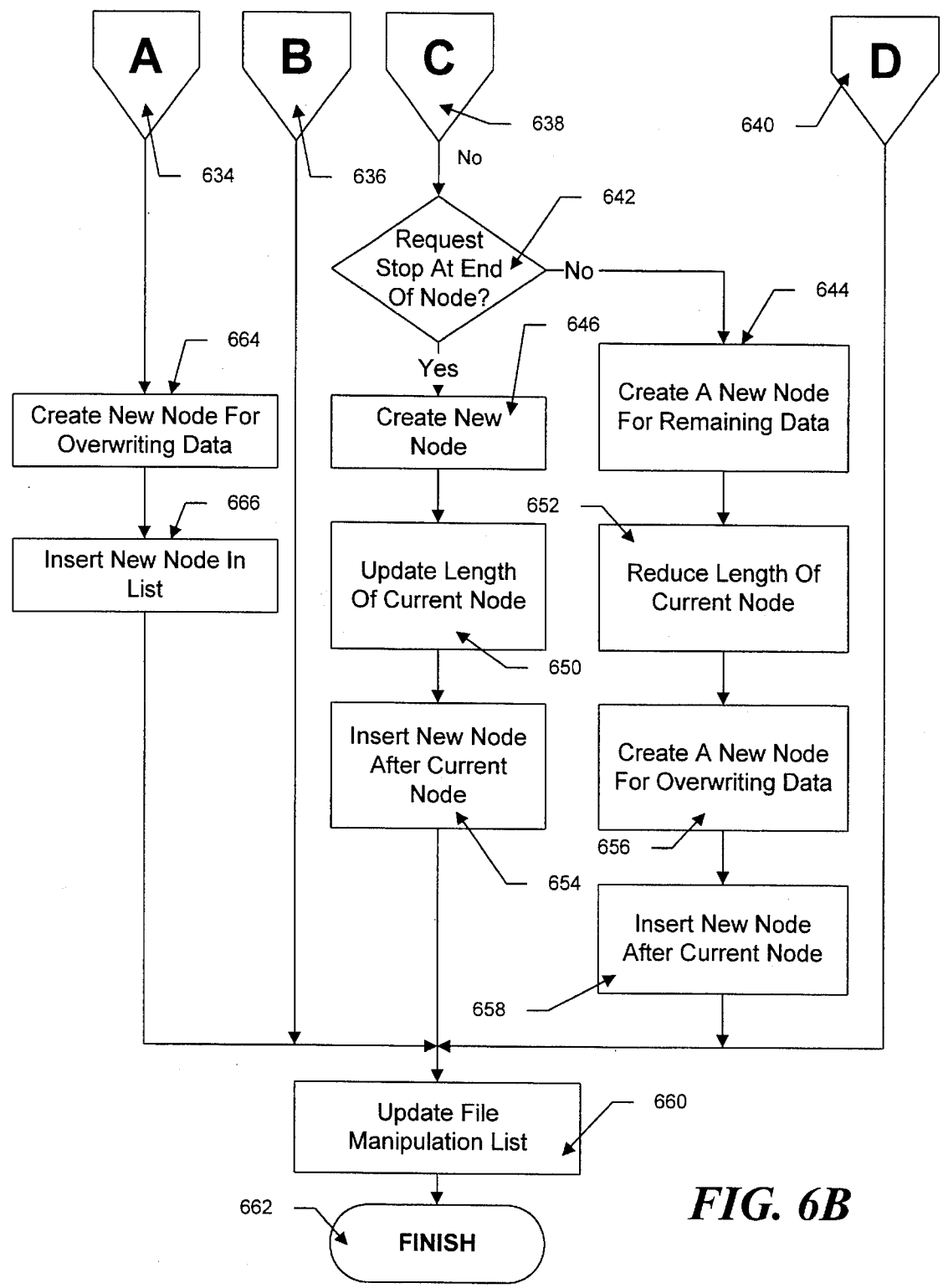

FIGS. 6A and 6B disclose an illustrative method for manipulating the file descriptor lists in the case where a portion of the multimedia file is to be overwritten by new data. Again, the associated editing program requests a seek to a particular logical position, thereby identifying the node in which the overwrite operation is to take place. The associated editing program also provides the information which is to overwrite portions of the file and its length.

In particular, the routine starts in step 600 and proceeds to step 602 where a determination is made whether the requested overwrite operation will overwrite all or only part of the file segment described by current node. If all of the current node file segment is to be overwritten, the routine proceeds to step 604 where an additional determination is made whether the requested overwrite information will overwrite the file segment exactly. If so, in step 606, the file handle stored in the current node is changed to identify the new file segment and, in step 608, the physical position of the new node is updated to correspond to the start of the data in the new file segment. The routine then proceeds, via off-page connectors 632 and 640 to step 660 where the file manipulation lists are updated to provide for data recovery journaling operations and the routine ends in step 662.

Alternatively, if in step 604, a determination is made that the requested overwrite operation will not overwrite exactly the entire current node, then the requested overwrite operation must be an overwrite of only a part of the current node. Consequently, the routine proceeds to step 610 where a determination is made whether the overwrite point begins at the start of the current node. If the request does begin at the start of the node, the routine proceeds to step 622 in which a new file descriptor node is created with a file handle, physical position, logical position and length corresponding to the file segment which is to overwrite the current segment in the multimedia file.

Then, in step 624, the physical position of the current node is increased and the length is decreased to account for the length of the overwriting information. Finally, the new node describing the overwriting information is inserted into the linked-list of file descriptor nodes before the current node (in a conventional fashion by manipulating the node pointers) as indicated in step 626. The routine then proceeds, via off-page connectors 628 and 636 to step 660 where the file manipulation list are updated and the routine finishes in step 662.

However, if, in step 610, a determination is made that the requested overwrite does not start at the beginning of the current node, then the routine proceeds, via off-page connectors 630 and 638, to step 642 where a determination is made whether the overwrite request stops at the end of the current node. If it does, the routine proceeds to step 646 in which a new node is created with the file handle, physical position and length of the overwriting information. The length of the current node is reduced in step 634 by the length of the overwriting information and the new node created in step 646 is inserted before the current node in step 654. The routine then proceeds to steps 660 and 662 as previously described.

If, in step 642, it is determined that the requested overwrite does not stop at the end of the node, then the request is to overwrite a portion of the data which is located in the middle of the file segment described by the current node (note that, in step 604, it was decided that the whole current node was not being overwritten). In this case, the current node must be split into two nodes in order to preserve the data which is NOT being overwritten. Consequently, the routine proceeds to step 644 where is a new node is created for the remaining data located after the overwritten segment. This new node has the same file handle as the current node, but the physical position and the logical position are increased from the current node by the length of the overwriting file segment plus the length of the file segment located before the overwrite point.

Next, in step 652, the length of the current node is reduced to account for the overwritten file portion and the routine proceeds to step 656 where a new node is created for the overwriting data using the file handle, physical position and length of the overwriting data. The logical position is set to the logical position of the current node plus the initial segment that is not being overwritten. In step 658 this latter new node is inserted into the linked-list after the current node by updating the pointer information in the list using conventional routines. The routine then proceeds to steps 660 and 662 and operates as previously described.

However, returning to step 602, it is determined that the requested overwrite operation is going to overwrite more nodes than just the current node, then the routine proceeds to step 612 where the length of the current node is reduced by the length of the file segment that is being overwritten. In step 614 a determination is made whether the length of the current node is zero. If the length of the current node has been reduced to zero, the node is removed from the linked-list in step 616. Then, in step 618, a determination is made whether the length of the file segment which is removed by removing the current node is equal to the total length to be removed. If not, the routine proceeds back to step 602 where the next node in the list becomes the "current" node and the operation is repeated.

Alternatively, if the removal of the current node caused total logical length removed to be equal to the total length to be overwritten, then the routine proceeds, via off-page connectors 620 and 634, to step 664 where a new node is created to describe the information which is being written to the file. This information includes the file handle, physical and logical positions and length of the overwriting data. In step 666, this latter new node is connected between the original node and the remainder of nodes in the list. The routine then proceeds to step 660 and 662, as previously described.

The present invention also provides for two additional linked lists which are used to provide data recovery and journaling operations. Data recovery operations generally allow the state of the system to be "backed up" to its state before the immediately previous editing operation. Alternatively, journaling involves reperforming an editing step which was just "undone" by a data recovery operation. One of the additional linked lists is used for data recovery (or undo), and the second list is used for journaling (or redo) operations. Each list consists of a set of linked "file manipulation" nodes and the file manipulation lists are used to insure that any editing operation (such as an insertion, deletion or overwrite operation) which was performed can be both undone and redone.

To this latter end, each file manipulation node contains a "snapshot" of the linked-list file descriptor nodes in the period of time which occurs right after an insertion, a deletion or an override. As each editing action is performed a new file manipulation node is created detailing the state of the system after the operation and added to the beginning of the data recovery linked-list. In general, if an action is to be undone the first file manipulation node in the data recovery is transferred from the data recovery list to the beginning of the journaling list. Then the new first node in the data recovery list is used to reset the state of the system in order to "undo" the effects of the previous editing operation.

Similarly, in order to "redo" an undone editing operation the first file manipulation node in the journaling list is transferred from the journaling list to the beginning of the data recovery list. This new first node in the data recovery list is then used to reset the state of the file descriptor list in order to redo the undone editing operation.

Figure 7:
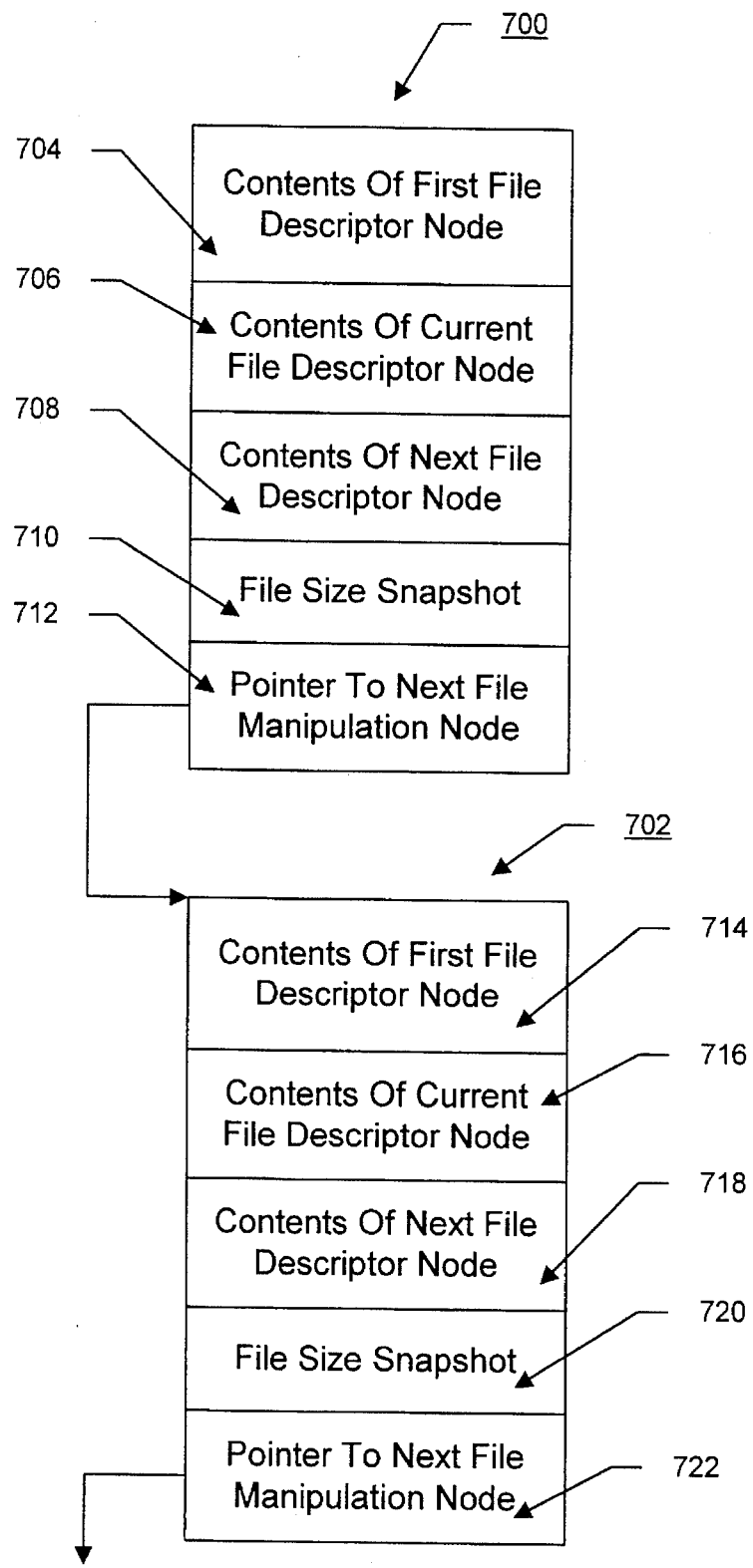
FIG. 7 is a block schematic diagram of two selected nodes of an illustrative file manipulation list used for undo and journaling operations.

FIG. 7 shows the layout of the file manipulation nodes in each of the two separate file manipulation lists. In particular, FIG. 7 shows a portion of a linked-list consisting of two nodes: node 700 and node 702. Node 700 comprises several different information sections each of which consists of a copy of the contents of selected file descriptor nodes in the file descriptor linked-list at the time when the list "snapshot" was taken. In particular, section 704 is a copy of the contents of the first file descriptor node in the file descriptor linked list at the time the snapshot was taken. Similarly, section 706 comprises the contents of the "current" file descriptor node at the time of the snapshot, and section 708 comprises the contents of the file descriptor node which follows the current file descriptor node. Information in section 710 contains a file size snapshot which is the maximum size of the file at the time the snapshot was taken (this data is necessary since the file can grow or shrink depending on the editing action). Finally, the file manipulation node is completed by a pointer 712 which points to the beginning of the next node 702.

Node 702 also comprises the contents of the first file descriptor node 714, the current file descriptor node, the next file descriptor node, a file size snapshot 720 and a pointer to the next file manipulator node 722. The information describing the "snapshot" which is stored in file manipulator node 702 is obviously different from that described in file manipulator node 700 since the snapshots are taken at different times. After each editing action that can change the state of the multimedia file, a snapshot of the linked-list file descriptor nodes is saved by creating a new file manipulation node and adding it to the data recovery list.

Figure 8:
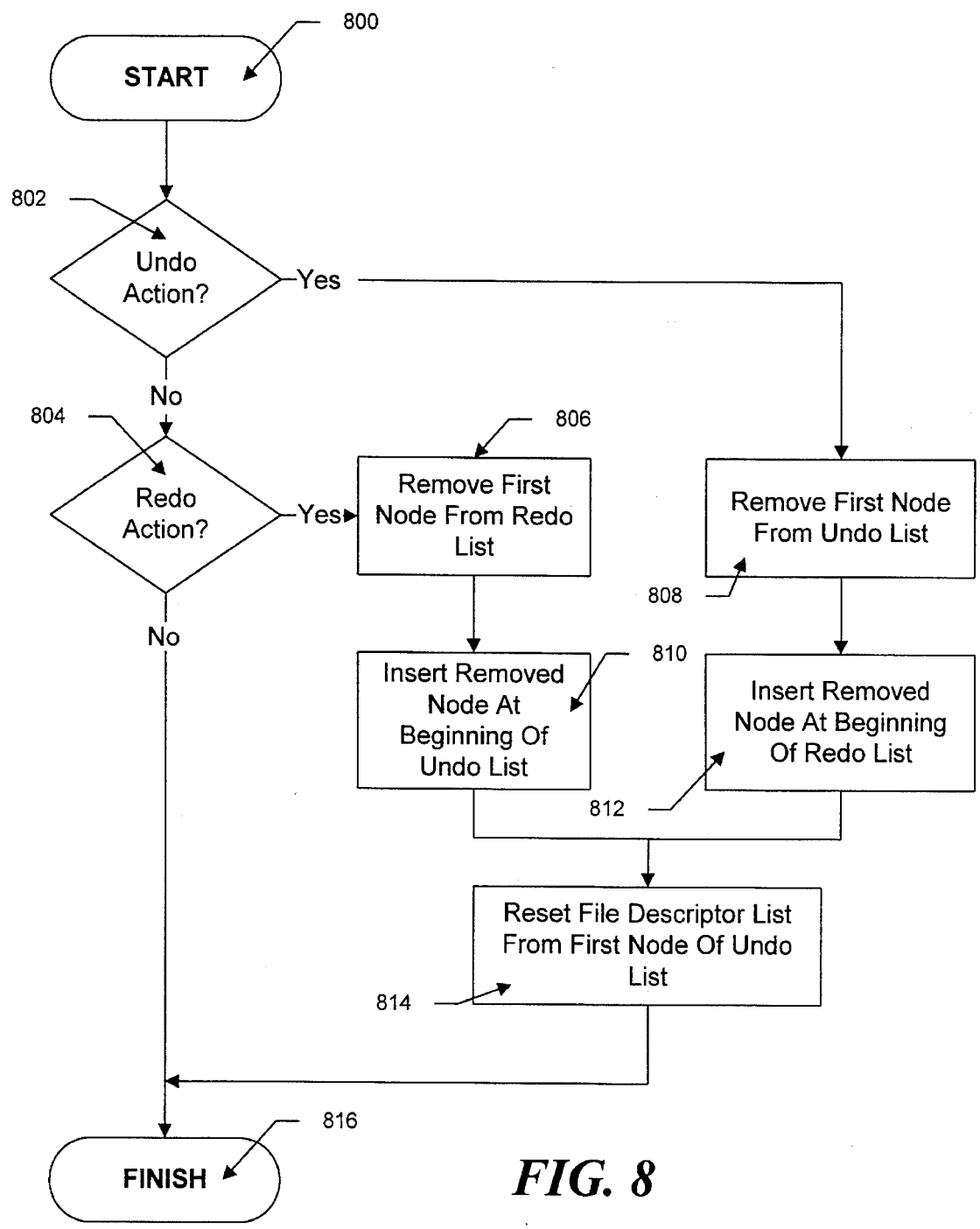
FIG. 8 is an illustrative flowchart of a method used to maintain the file manipulation list during an undo and a redo operation.

The file manipulator lists are used in a manner described in connection with FIG. 8. In particular, the update of the file manipulator lists starts in step 800 and proceeds to step 802. In step 802, a determination is made whether user wishes to undo a previous editing. Such a determination would be made by user interaction with the editing application in a conventional manner. If an undo action is requested, the routine proceeds to step 808 in which the first node in the data recovery (undo) file manipulator list is removed from the list making the next node the new first node. The removed node information is inserted into a new node which is added to the beginning of the data journaling list.

The routine then proceeds to step 814 where all of the state information associated with the first node of the data recovery list is used to reset the state of the file descriptor node list. The routine then ends in step 816.

Alternatively, if, in step 802, it is determined that an undo action is not requested the routine proceeds to step 804 in which a determination is made whether a redo action is requested. If a redo action is not requested the routine ends in step 816.

Alternatively, if a redo action is requested in step 804, the routine proceeds to step 808 in which the first node in the journaling (redo) file manipulator list is removed from the list making the next node the new first node. The removed node information is inserted into a new node which is added to the beginning of the data recovery list.

The routine then proceeds to step 814 where all of the state information associated with the first node of the data recovery list is used to reset the state of the file descriptor node list. The routine then ends in step 816.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Apparatus for editing a multimedia file comprised of a sequential plurality of data units generated by sampling an analog signal and encoding each sample as a data unit, and each of the plurality of data units being located in a physical file having an address indicating the start of the physical file and a physical file length, the apparatus operating under control of an editing application and comprising:

apparatus responsive to the physical file address and length for constructing a node representing a sequential plurality of data units comprising a segment of the multimedia file, the node comprising the physical file address, and a physical position of the represented file segment in the physical file;

apparatus responsive to editing commands generated by the editing application for changing information contained in the node in order to edit the represented file segment; and apparatus responsive to the physical file address and length of each of the plurality of file segments for constructing a linked list comprising a plurality of said nodes.

2. Apparatus for editing a multimedia file according to claim 1 wherein each of the plurality of nodes further comprises a logical position indicating the position of the represented file segment in the multimedia file and the number of data units in the represented file segment.

3. Apparatus for editing a multimedia file according to claim 1 further comprising apparatus responsive to commands generated by the editing application for inserting nodes into the linked list and deleting nodes from the linked list in order to insert and delete file segments from the multimedia file.

4. Apparatus for editing a multimedia file according to claim 1 further comprising apparatus responsive to commands generated by the editing application for splitting a node in the linked list into two nodes and for inserting an additional node between the two nodes in order to insert information into the multimedia file.

5. Apparatus for editing a multimedia file according to claim 1 further comprising apparatus responsive to commands generated by the editing application for splitting nodes into the linked list into a first and second node and for linking the first node to a following node in order to delete information from the multimedia file.

6. Apparatus for editing a multimedia file comprised of a sequential plurality of data units generated by sampling an analog signal and encoding each sample as a data unit, the multimedia file being comprised of a plurality of file segments, each of the plurality of file segments having an address indicating a physical file in which each file segment is located and a length comprising a number of data units in each file segment, the multimedia file editing apparatus operating under control of an editing application and comprising:

apparatus responsive to the file segment address and file segment length of each of the plurality of file segments for constructing a linked list comprising a plurality of nodes, each of the plurality of nodes representing a sequential plurality of data units comprising each file segment of the multimedia file, each node comprising the physical file address of the represented file segment, a physical position of the represented file segment in the physical file in which the segment is located, a logical starting position indicating the position of a first data unit in the represented file segment relative to the plurality of data units in the multimedia file and the number of data units in the represented file segment;

apparatus responsive to editing commands generated by the editing application for adding and removing nodes from the linked list in order to insert and delete data units from the multimedia file; and apparatus responsive to editing commands generated by the editing application for changing information contained in a node in order to insert and delete data units from the multimedia file.

7. Apparatus for editing a multimedia file according to claim 6 wherein the editing application generates commands for data insertion, data deletion and data overwriting and the apparatus for editing the multimedia file further comprises:

apparatus responsive to a command to insert into the multimedia file, an insertion file segment having a length and being located in a first insertion file, the apparatus creating a new node comprising an address of the first insertion file, a physical position of the insertion file segment in the first insertion file, a logical starting position indicating the position of the first data unit in the insertion file segment relative to the plurality of logical units in the multimedia file and the number of data units in the insertion file segment; and apparatus responsive to the command to insert into the multimedia file for inserting the new node into the linked list at an insertion point indicated by the editing application.

8. Apparatus for editing a multimedia file according to claim 7 wherein the apparatus for inserting the new node into the linked list compares the insertion point to the logical starting position information in each node to determine where in the linked list the new node is to be inserted.

9. Apparatus for editing a multimedia file according to claim 8 wherein the apparatus for inserting the new node into the linked list inserts the new node before a first existing node if the insertion point is at the beginning of the first existing node and the apparatus for inserting the new node into the linked list inserts the new node after a second existing node if the insertion point is at the end of the second existing node and the apparatus for inserting the new node into the linked list splits an existing third node into two partial nodes and inserts the new node between the two partial nodes if the insertion point is within the third existing node.

10. Apparatus for editing a multimedia file according to claim 6 further comprising:

apparatus, responsive to a command to delete from the multimedia file a predetermined number of data units at a deletion point, for changing information contained in a node, which node represents a file segment containing the deletion point in order to reduce the length information in the node; and apparatus, responsive to a command to delete from the multimedia file a predetermined number of data units at a deletion point, for removing a node from the linked list, which node represents a file segment containing data units within the number of data units to be deleted.

11. Apparatus for editing a multimedia file according to claim 10 further comprising:

apparatus, responsive to a command to delete from the multimedia file a predetermined number of data units at a deletion point, for splitting a node which represents a file segment containing the deletion point into two nodes; and apparatus for linking the two nodes in order to delete information between the two nodes.

12. Apparatus for editing a multimedia file according to claim 6 further comprising:

apparatus, responsive to a command to overwrite a predetermined number of data units in the multimedia file at an overwrite point from an overwrite file segment contained in an overwrite file, for changing information contained in a node, which node represents a file segment containing the overwrite point in order to remove a portion of the file segment from the multimedia file; and apparatus responsive to a command to overwrite a predetermined number of data units in the multimedia file at an overwrite point, for creating a new node comprising an address of the overwrite file, a physical position of the overwrite file segment in the overwrite file, a logical starting position indicating the position of the first data unit in the overwrite file segment in the plurality of data units in the multimedia file and the number of data units in the overwrite file segment; and apparatus responsive to the command to overwrite a predetermined number of data units in the multimedia file for inserting the new node into the linked list at the overwrite point.

13. A method for editing a multimedia file comprised of a sequential plurality of data units generated by sampling an analog signal and encoding each sample as a data unit, and each of the plurality of data units being located in a physical file having an address indicating the start of the physical file, the method operating in cooperation with an editing application and comprising the steps of:

A. constructing a node representing a sequential plurality of data units comprising a segment of the multimedia file, the node comprising the physical file address, and a physical position of the represented file segment in the physical file, B. changing information contained in the node in order to edit the represented file segment in response to editing commands generated by the editing application; and C. constructing a linked list comprising a plurality of said nodes, each of said nodes representing a sequential plurality of data units comprising a segment of the multimedia file.

14. A method for editing a multimedia file according to claim 13 wherein each of said nodes further comprises a logical position indicating the position of the represented file segment in the plurality of logical units in the multimedia file and the number of data units in the represented file segment.

15. A method for editing a multimedia file according to claim 13 further comprising the step of:

D. inserting nodes into the linked list and deleting nodes from the linked list in response to commands generated by the editing application in order to insert and delete file segments from the multimedia file.

16. A method for editing a multimedia file according to claim 13 further comprising the step of:

E. splitting a node in the linked list into two nodes; and

F. inserting an additional node between the two nodes in response to commands generated by the editing application in order to insert information into the multimedia file.

17. A method for editing a multimedia file according to claim 13 further comprising the steps of:

G. splitting nodes into the linked list into a first node and a second node; and H. linking the first node with a succeeding node in response to commands generated by the editing application in order to delete information from the multimedia file.

18. A computer program product comprising:

a computer usable medium having computer readable program code means embodied therein for editing a multimedia file comprised of a sequential plurality of data units generated by sampling an analog signal and encoding each sample as a data unit, each of the plurality of data units being located in a physical file having an address indicating the start of the physical file, the computer program product further comprising:

program code means for constructing a node representing a sequential plurality of data units comprising a segment of the multimedia file, the node comprising the physical file address, and a physical position of the represented file segment in the physical file, program code means for changing information contained in the node in order to edit the represented file segment in response to editing commands generated by the editing application; and program code means for constructing a linked list comprising a plurality of said nodes, each of said nodes representing a sequential plurality of data units comprising a segment of the multimedia file.

19. The computer program product of claim 18 wherein:

each of said nodes further comprises a logical position indicating the position of the represented file segment in the plurality of logical units in the multimedia file and the number of data units in the represented file segment.

20. The computer program product of claim 18 further comprising:

program code means for inserting nodes into the linked list and deleting nodes from the linked list in response to commands generated by the editing application in order to insert and delete file segments from the multimedia file.

21. The computer program product of claim 18 further comprising:

program code means for splitting a node in the linked list into two nodes; and program code means for inserting an additional node between the two nodes in response to commands generated by the editing application in order to insert information into the multimedia file.

22. The computer program product of claim 18 further comprising:

program code means for splitting nodes into the linked list into a first node and a second node; and program code means for linking the first node with a succeeding node in response to commands generated by the editing application in order to delete information from the multimedia file.

* * * * *